Dec. 30, 1924.
K. WEIDLICH
MEAT CHOPPER
Filed Jan. 21, 1924
1,521,346
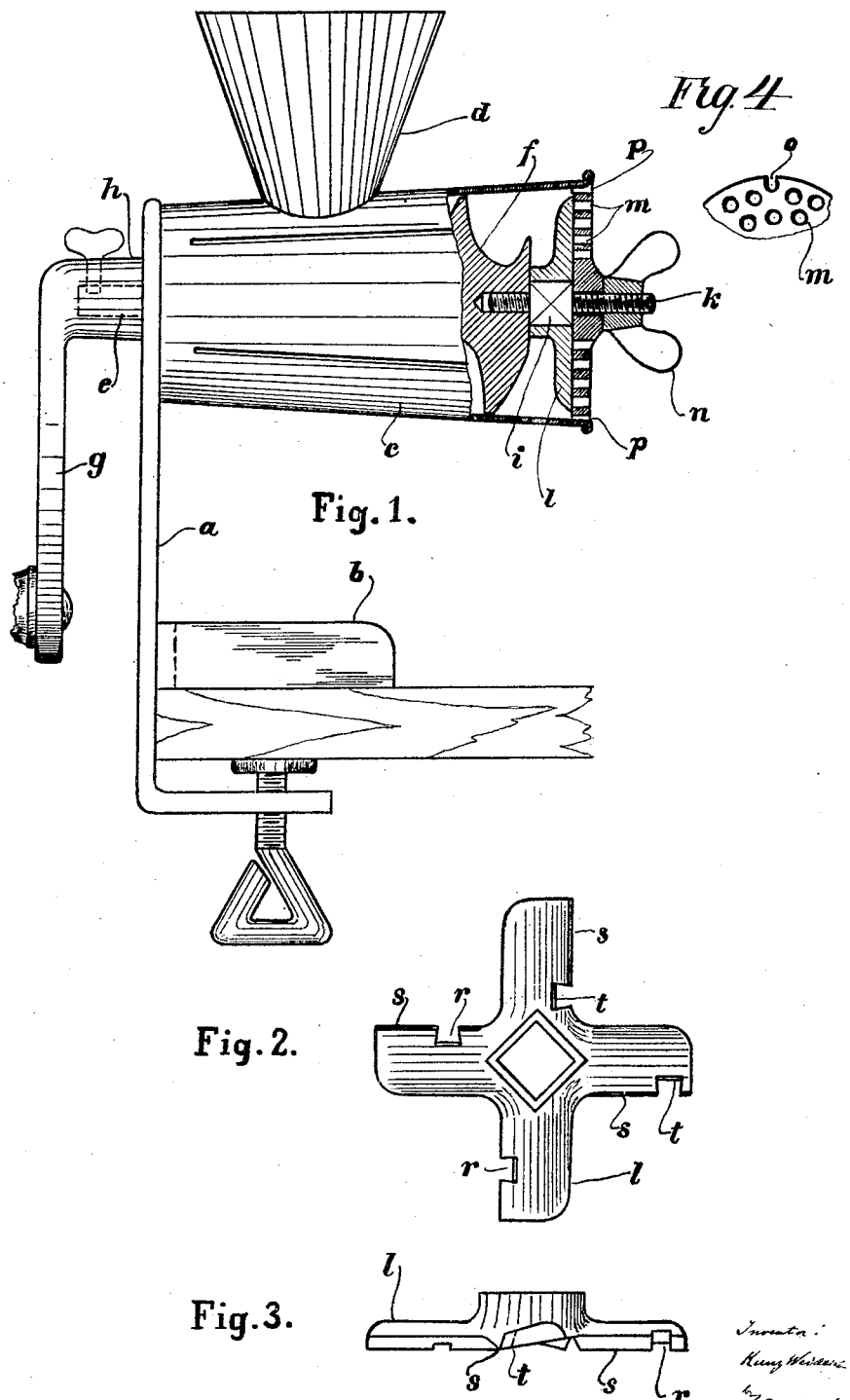

Patented Dec. 30, 1924.

1,521,346

UNITED STATES PATENT OFFICE.

KUNZ WEIDLICH, OF NUREMBERG, GERMANY.

MEAT CHOPPER.

Application filed January 21, 1924. Serial No. 687,633.

*To all whom it may concern:*

Be it known that I, KUNZ WEIDLICH, a citizen of the German Republic, residing at Nuremberg, Germany, have invented certain new and useful Improvements in Meat Choppers, of which the following is a specification.

The commonly used meat chopping machine comprising multi-blade knives and perforated pressing plate present the inconvenience that at the chopping of stringy or tough meat the sinews and tendons are not cut through but wind around the knife obstructing thus more and more the passage for the meat.

Machines of this type must therefore be frequently taken to pieces to free the knife from the sinews.

The invention obviates these inconveniences by providing in the cutting edges of the knife blades shaped out portions which are displaced with regard to one another so that the cutting edges of these shaped out portions act on different points of the pressing plate. The sinews and tendons, which would otherwise wind around the hub of the knife and around the knife blades, slip, in this improved knife, into the shaped out portions under tension, they are caught in these shaped-out portions and cut off by the cutting edges of the shaped-out portions when the tension increases, as experiments have shown.

The invention will be best understood from a consideration of the following detailed description taken in connection with the accompanying drawings forming a part of this specification, with the understanding that while on the drawings one embodiment of the inventon is disclosed, the invention is not confined to any strict conformity with the showing of the drawings, but may be embodied in any manner which does not make a material departure from the salient features of the invention.

In the drawings:—

Fig. 1 shows the meat chopper in elevation partly in section.

Fig. 2 shows the knife in plan view.

Fig. 3 shows the knife in side elevation on a larger scale.

Fig. 4 shows in front elevation a portion of the pressing plate.

The machine frame consists of a strong strip $a$ of flat iron which is bent at right angles at the lower end. A U-shaped flat iron bow $b$ is fixed on strip $a$. The worm casing $c$ and the hopper $d$ of the same are made from sheet iron and welded together. The flat iron frame and the worm casing with the hopper are enamelled separately and then fixed together by means of screws. With this object in view the worm casing has a bottom plate $u$ fixed on the frame $a$ by means of screws $v$.

A crank handle $g$ put on the journal $e$ of the conveyor worm $f$ serves to operate the machine in the well known manner. The journal $e$ is journaled in the flat iron $a$ and the hub $h$ of the crank handle is fixed on this journal in such a manner that the conveyor worm is secured against lateral displacement. A square head $i$ with screw bolt $k$ is screwed into the outer face of the conveyor worm $f$. The multi-blade knife $l$ is mounted on the square head $i$ and the perforated pressing plate $m$ is pressed against the knife by means of a wing nut $n$. The pressing plate has in its circumference one or several notches $o$ (Fig. 4) with which engage nipples $p$ on the worm casing $c$, so that the pressing plate $m$ is secured against rotation. The four-blade knife $l$, known per se, has shaped-out portions $r$ of dove-tailed cross section arranged at different distances from the axis of rotation. In these shaped out portions, the edges $t$ of which parallel to the cutting edges $s$ of the knife blades form also cutting edges, the sinews and tendons of the meat are caught and cut through when the tension increases.

I claim:—

A meat chopper comprising in combination with the commonly used perforated pressure plate, a knife comprising four blades each blade having a shaped out portion in its cutting edge with sharp edges, said shaped out portion being displaced with regard to the shaped out portions of the other cutting edges so that the sharp edges of each shaped out portion acts at a different circular face of the said perforated pressing plate.

In testimony whereof I have fixed my signature in presence of two witnesses.

KUNZ WEIDLICH.

Witnesses:
ALESANDE DE SOTO,
ALEXIS V. PHI APPOFF.